(12) United States Patent
Bard et al.

(10) Patent No.: US 9,145,093 B1
(45) Date of Patent: Sep. 29, 2015

(54) TRUNK SERVER/BUTLER

(71) Applicants: Robert Alan Bard, Loveladies, NJ (US);
Elisheva B Chamblin, Beach Haven, NJ (US); Eleanor H. Bard, Loveladies, NJ (US); Jay Howard Chamblin Chamblin, Beach Haven, NJ (US)

(72) Inventors: Robert Alan Bard, Loveladies, NJ (US);
Elisheva B Chamblin, Beach Haven, NJ (US); Eleanor H. Bard, Loveladies, NJ (US); Jay Howard Chamblin Chamblin, Beach Haven, NJ (US)

(*) Notice: Subject to any disclaimer, the term of this patent is extended or adjusted under 35 U.S.C. 154(b) by 47 days.

(21) Appl. No.: 13/999,941

(22) Filed: Apr. 7, 2014

(51) Int. Cl.
| | |
|---|---|
| *B62D 43/10* | (2006.01) |
| *B60R 5/04* | (2006.01) |
| *B66F 7/06* | (2006.01) |
| *B60P 3/36* | (2006.01) |
| *B66F 13/00* | (2006.01) |

(52) U.S. Cl.
CPC . *B60R 5/04* (2013.01); *B62D 43/10* (2013.01); *B66F 7/065* (2013.01); *B66F 7/0633* (2013.01); *B60P 3/36* (2013.01); *B66F 13/00* (2013.01)

(58) Field of Classification Search
CPC ........ B66F 7/0641; B66F 13/00; B66F 19/00; B66F 5/02; B66F 7/24; B60P 1/4414; Y10S 254/09; Y10S 414/13
USPC ................ 187/254, 256; 224/508; 248/277.1; 254/10 C, 10 R, 127, 131, 4 C, 4 R, 8 C, 254/91; 312/266; 414/676, 678, 917, 462
See application file for complete search history.

(56) References Cited

U.S. PATENT DOCUMENTS

| | | | | | |
|---|---|---|---|---|---|
| 145,887 | A | * | 12/1873 | McGregor | 254/4 C |
| 602,259 | A | * | 4/1898 | Jandro | 254/133 R |
| 804,771 | A | * | 11/1905 | Sawyer | 254/91 |
| 1,145,264 | A | * | 7/1915 | Pflug | 312/266 |
| 1,224,561 | A | * | 5/1917 | Nelson | 254/91 |
| 1,432,159 | A | * | 10/1922 | Davis | 254/91 |
| 2,497,472 | A | * | 2/1950 | Sims | 187/211 |
| 2,686,038 | A | * | 8/1954 | Dutzman | 254/91 |
| 2,953,287 | A | * | 9/1960 | Werner | 224/496 |
| 2,963,176 | A | * | 12/1960 | Smith | 414/680 |
| 3,406,999 | A | * | 10/1968 | Kozicki | 296/156 |
| 3,785,462 | A | * | 1/1974 | Coad et al. | 187/262 |
| 3,857,623 | A | * | 12/1974 | Schneller | 312/266 |
| 4,027,492 | A | * | 6/1977 | Carpenter | 405/3 |
| 4,455,948 | A | * | 6/1984 | Torres | 108/44 |
| 4,787,327 | A | * | 11/1988 | Porter | 114/44 |
| 4,941,797 | A | * | 7/1990 | Smillie, III | 414/462 |
| 4,969,793 | A | * | 11/1990 | Pawl | 414/462 |
| 5,301,992 | A | * | 4/1994 | Whitmore | 296/37.1 |
| 6,648,786 | B1 | * | 11/2003 | Poehlau | 475/163 |
| 7,497,052 | B2 | * | 3/2009 | Hu | 52/111 |

* cited by examiner

*Primary Examiner* — Gregory Adams

(57) ABSTRACT

An apparatus to assist people and minimize back strain/sprain when people are placing items into the vehicle's trunk and when people are removing items from the vehicle's trunk. The apparatus is installed in the vehicle's trunk so that the apparatus when activated, can both lift items above the location where the lowest portion of the vehicle's trunk lid rests when the vehicle's trunk lid is closed and also rearward of the location/position where the lowest portion of the vehicle's trunk lid rests when the vehicle's trunk lid is closed. The result is an easier and more convenient location/position to remove packages/items from the vehicle's trunk or to load packages/items into the vehicle's trunk to help prevent back injuries caused by bending forward to pick up packages/items from the vehicle's trunk or to place packages/items into the vehicle's trunk.

4 Claims, 7 Drawing Sheets

TRUNK SERVER/BUTLER

BRIEF DESCRIPTION OF THE INVENTION

It is the object of the present invention to make it easier for people to place packages/items into the vehicle's trunk and to remove packages/items from the vehicle's trunk. More specifically, the invention consists of a mechanically operated platform which can be raised simultaneously upward and outward from the floor area of a vehicle's trunk and rearward relative to the front of the vehicle or lowered simultaneously downward towards the floor of the vehicle's trunk and at the same time forward relative to the front of the vehicle.

DETAILED DESCRIPTION OF INVENTION

Figure 1:
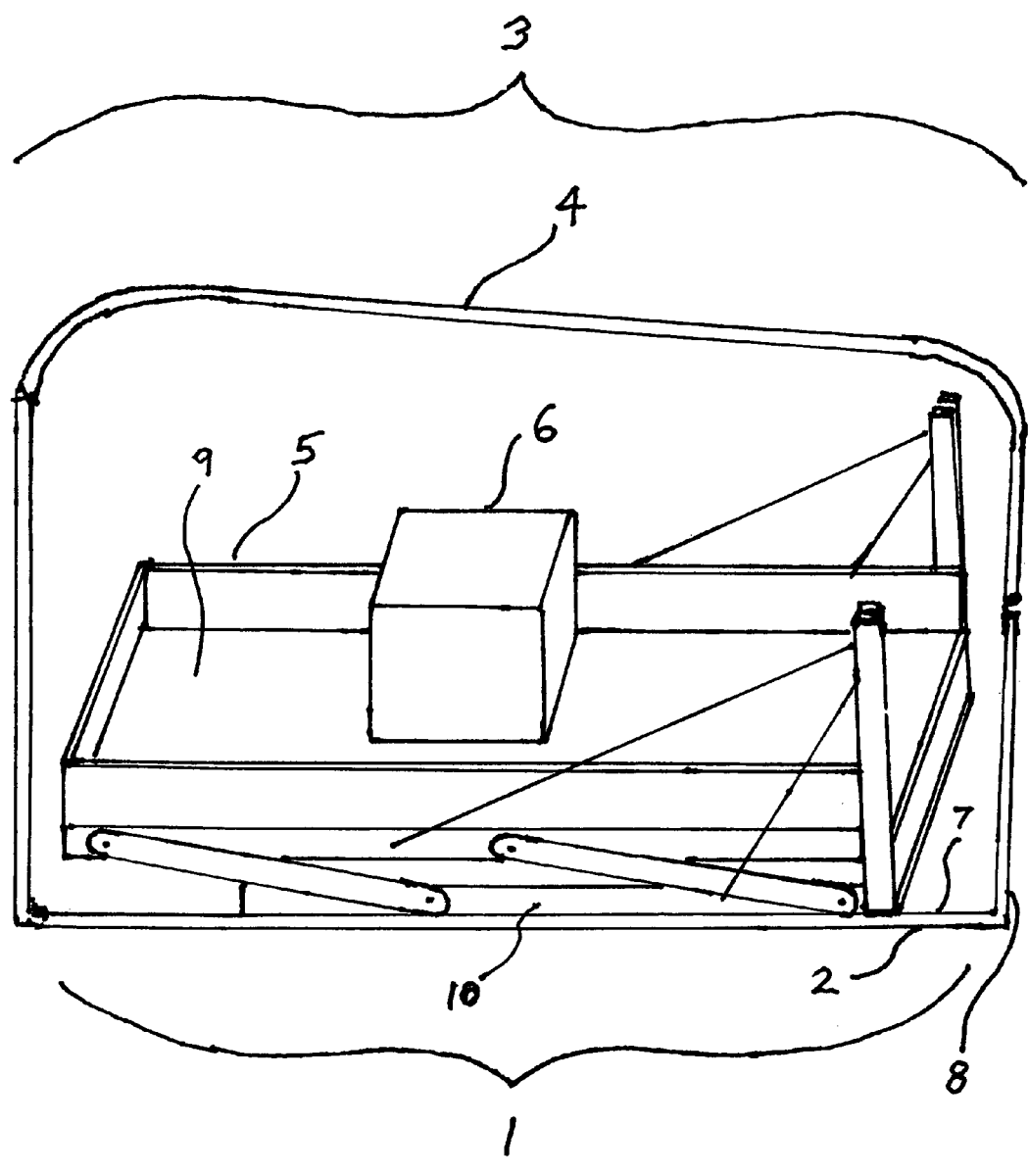
FIG. 1 is a cut-away side view of a first embodiment of the apparatus in a fully collapsed position resting on the floor portion of the trunk of the vehicle.

FIG. 1 is a cut away side view of the fully collapsed apparatus 1 positioned/located on the floor portion 2 of the vehicle's trunk 3 with the vehicle's trunk lid 4 fully closed and with the apparatus's 1 moveable upper platform 5 supporting a package(s)/item(s) 6. The apparatus 1 is designed to be positioned/located/installed on the upper surface 7 of the floor portion 2 of the vehicle's trunk 3 such that the apparatus 1 is also situated in front of the rear portion 8 of the vehicle's trunk 3. Also shown is the upper surface 9 of the apparatus's movable upper platform 5 and the rigid base 10.

Figure 2:
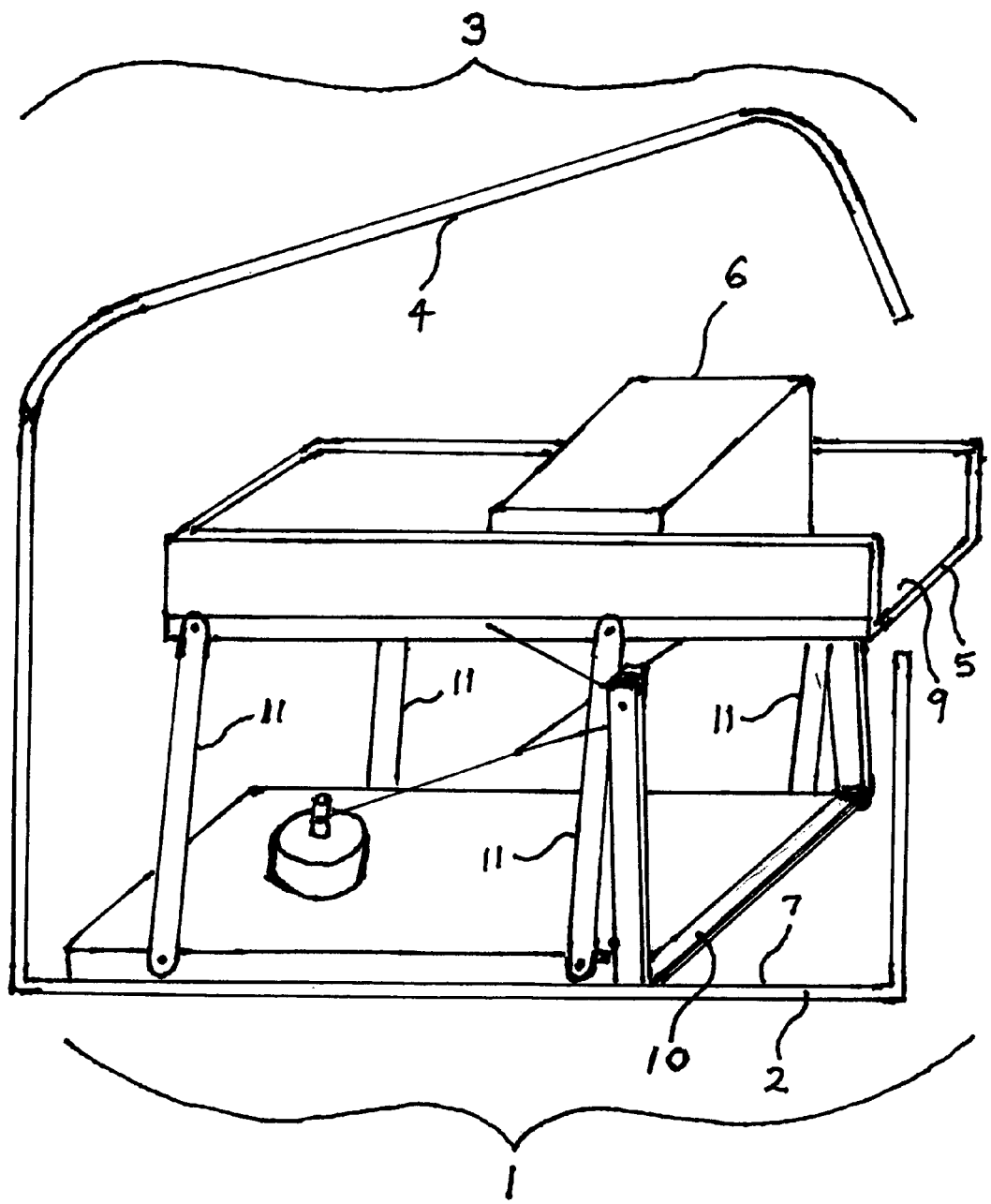
FIG. 2 is a cut-away side view of a first embodiment depicting the movable upper platform in fully raised position as well as being fully extended rearward relative to the front of the vehicle.

FIG. 2 is a cut away side view of the apparatus 1 fully raised upward as well as fully extended rearward relative to the front of the vehicle with a package(s)/item(s) 6 supported on the upper surface 9 of the apparatus's moveable upper platform 5 with the vehicle's trunk lid 4 fully open. The apparatus 1 is composed of the following: a rigid base 10 which can be held in place on the upper surface 7 of the floor portion 2 of the vehicle's trunk 3 either by virtue of its weight (ballast) alone or by virtue of the rigid base 10 being permanently fastened to the upper surface 7 of the floor portion 2 of the vehicle's trunk 3. The rigid base 10 serves as a mounting device for the apparatus's moveable upper platform 5 which simultaneously pivots upward and rearward to be in a position to allow people to more conveniently remove a package(s)/item(s) 6 from the vehicle's trunk 3 and which simultaneously pivots downward and forward relative to the front of the vehicle to more conveniently enable a person to place a package(s)/item(s) 6 into the vehicle's trunk 3. The apparatus's pivot lift support struts 11, connect the rigid base 10 to the apparatus's moveable upper platform 5 such that as the tops of the pivot lift support struts 11 move simultaneously upward as well as rearward relative to the front of the vehicle, the 4 pivot lift support struts 11 simultaneously raise upward and move rearward relative to the front of the vehicle as does the apparatus's moveable upper platform 5 and, conversely, as the tops of the pivot lift support struts 11 move forward relative to the front of the vehicle, the apparatus's moveable upper platform 5 is simultaneously lowered and moved forward closer to the front of the vehicle. The pivot lift support struts 11, may be caused to rotate by several different mechanisms as discussed in FIG. 5 and FIG. 6.

Figure 3:
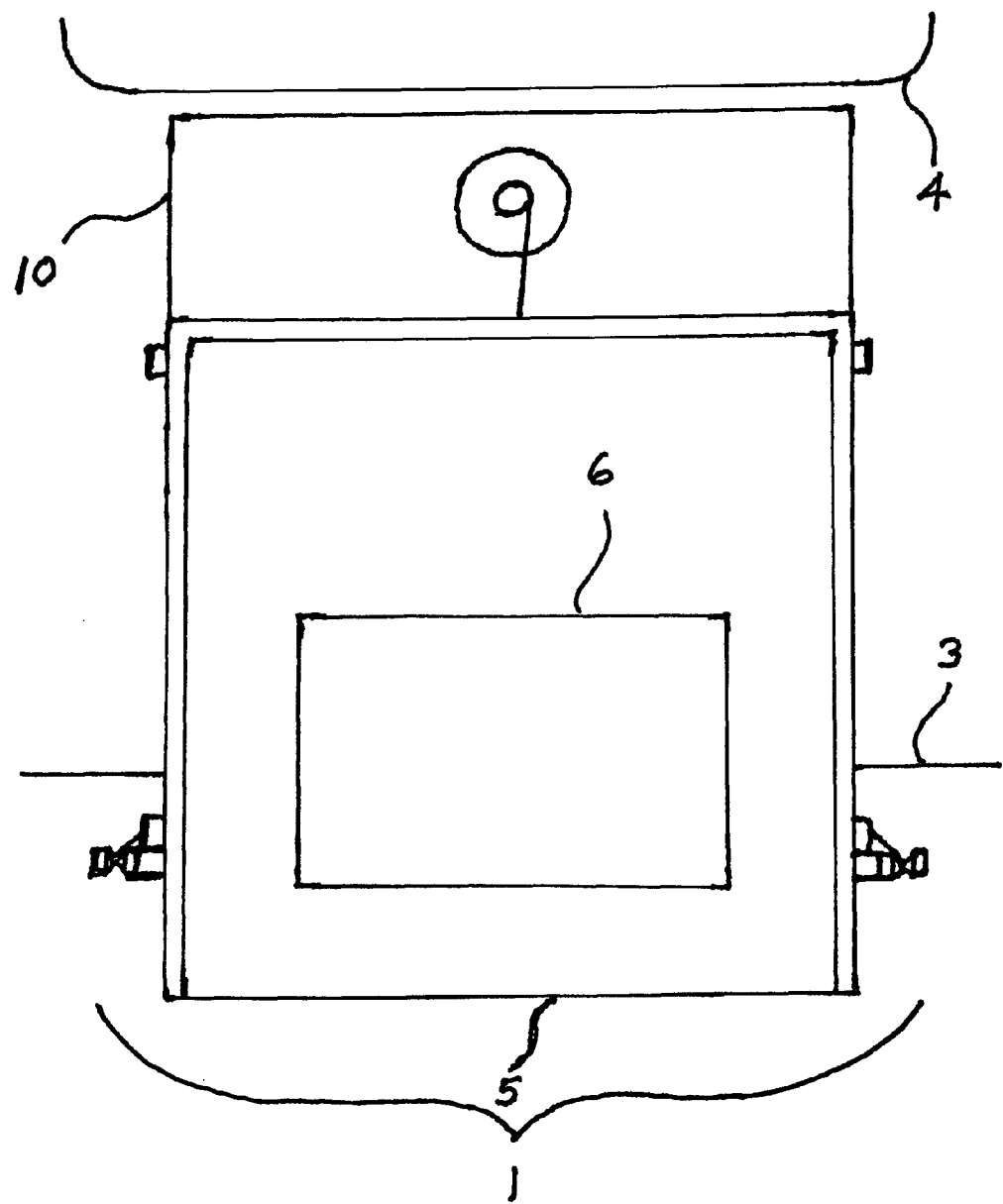
FIG. 3 is a top view of a first embodiment depicting the movable upper platform supporting a package/item fully raised upward as well as fully extended rearward relative to the front of the vehicle and in addition, a portion of the rigid base portion of the apparatus with the vehicle's trunk lid in the full open position.

FIG. 3 is a top view of the fully raised upward as well as fully extended rearward relative to the front of the vehicle moveable upper platform 5 of the apparatus 1 supporting a package(s)/item(s) 6 and, in addition, showing a portion of the ridged base 10 portion of the apparatus 1 with the vehicle's trunk lid 4 in the full open position. Also shown is the rear most location/position of the trunk 3.

Figure 4:
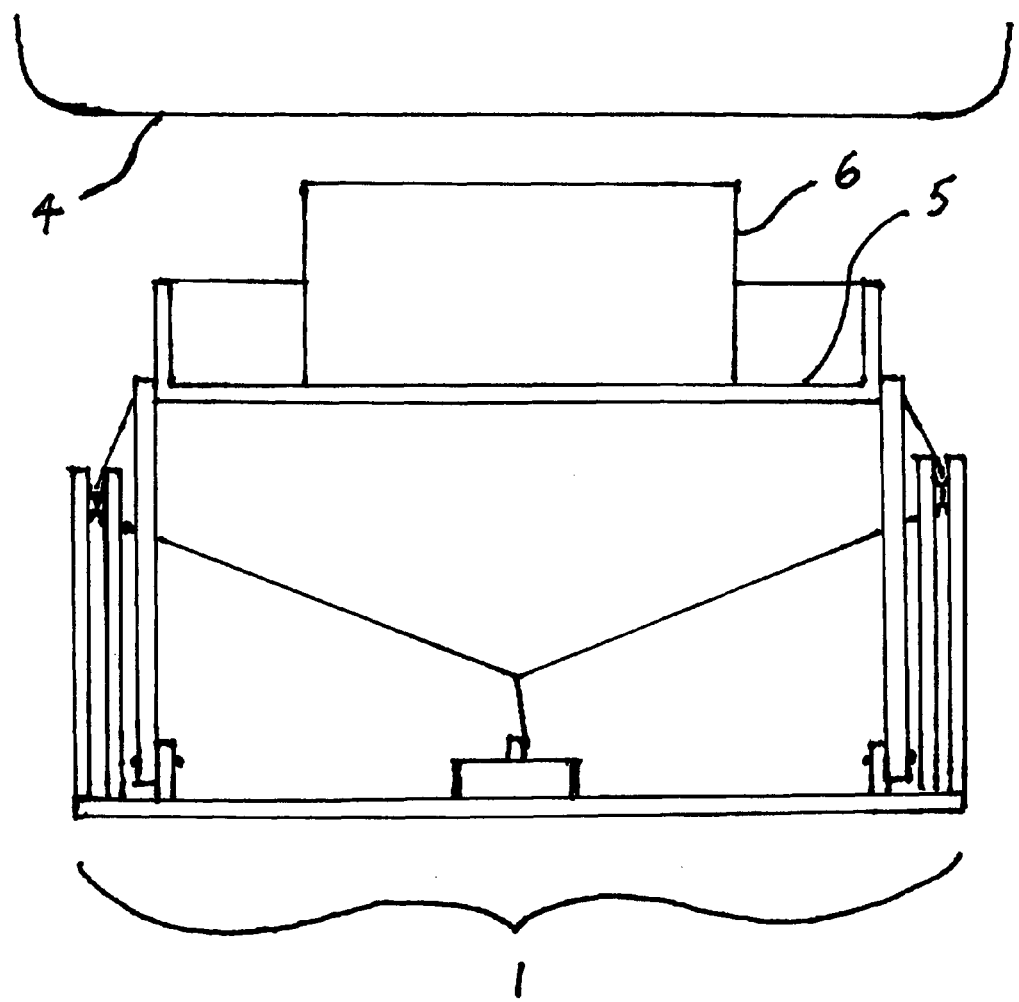
FIG. 4 is a rear end view of a first embodiment with the movable upper platform's upper surface supporting a package/item with the vehicle's trunk lid in the full open position.

FIG. 4 is a rear end view of the apparatus 1 in its fully extended upward and rearward relative to the front of the vehicle configuration with the moveable upper platform 5 of the apparatus 1 supporting a package(s)/item(s) 6 with the vehicle's trunk lid 4 in the full open position.

Figure 5:
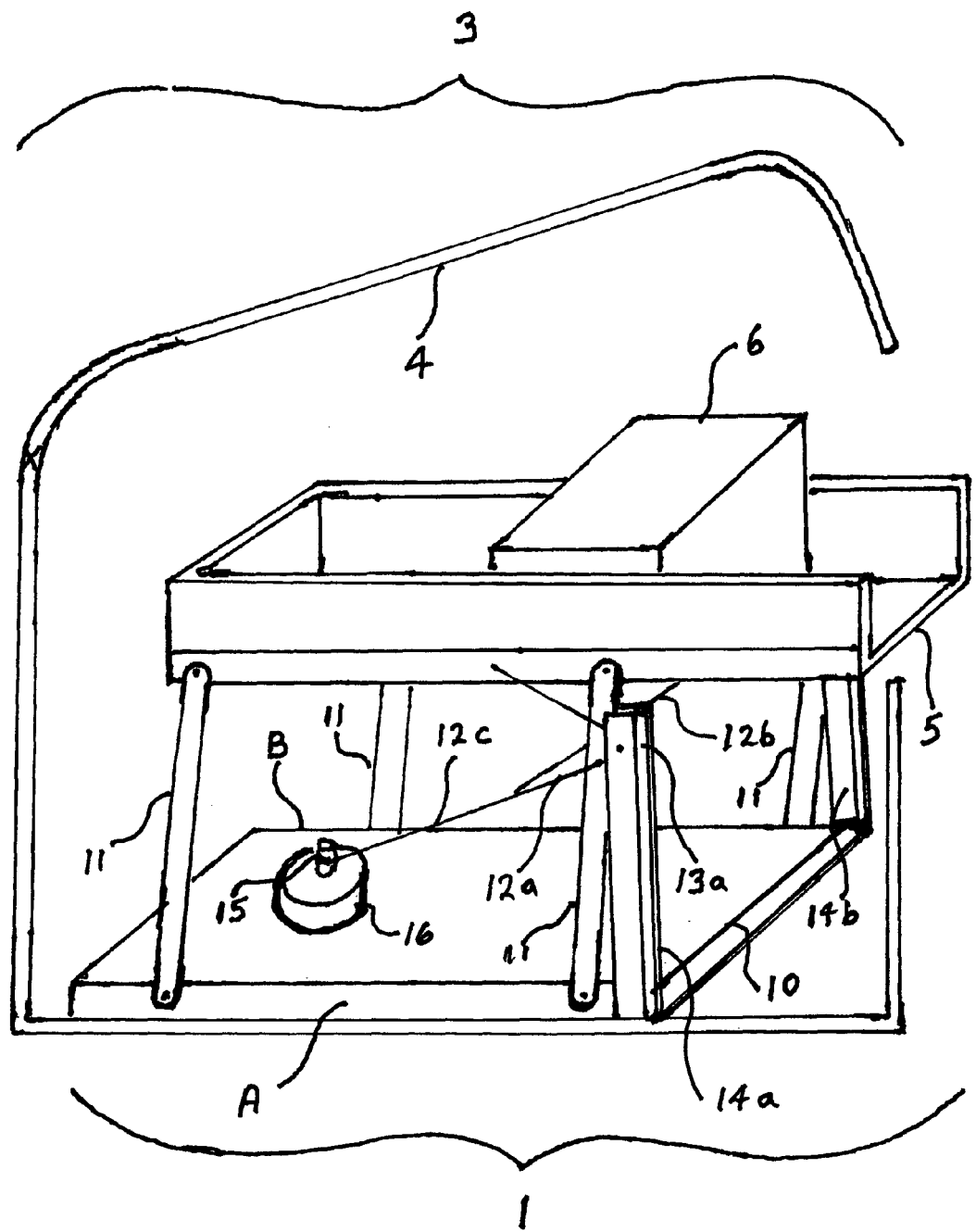
FIG. 5 shows a first embodiment including a cable system which raises and lowers the movable upper platform.

FIG. 5 shows the apparatus 1 in the fully raised upward and rearward position supporting a package(s)/item(s) 6 with the vehicle's trunk lid 4 of the vehicle's trunk 3 fully open such that the apparatus 1 is employing a cable system having a total of three cable legs as follows: whereby two cable legs 12a and 12b of the cable system are connected such that cable leg 12a is connected to one side A of the apparatus's moveable upper platform 5 and then is drawn over/around pulley 13a mounted on the vertical or approximately vertical dual stanchion 14a and then drawn to the meeting point of the three legs of the cable system while cable leg 12b is connected to the other side B of the apparatus's moveable upper platform 5 and is then drawn over/around pulley 13b (not shown because pulley 13b is blocked by the apparatus's moveable platform 5) mounted on the vertical of approximately vertical dual stanchion 14b and then drawn to the meeting point of the three legs of the cable system while cable leg 12c is connected on one end to the meeting point of the three legs of the cable system and then drawn to the output shaft/spindle 15 of the "geared down"/reduced output speed motor 16 which is mounted on the rigid base 10 such that when the "geared down"/reduced output speed motor 16 rotates in one direction, the output shaft/spindle winds up/draws cable leg 12c and thus causes increased tension in the entire cable system in turn causing the moveable upper platform 5 to be drawn with the help of the rotatable pivot lift support struts 11 simultaneously both rearward towards the vertical or approximately vertical dual stanchions 14a and 14b and upward from the rigid base 10 to assist in removing a package(s)/item(s) 6 from the vehicle's trunk. Conversely, as the "geared down"/reduced output speed motor 16 rotates in the opposite direction it causes the tension in the cable system to be reduced and thus the strong force of gravity causes the moveable upper platform 5 to be pulled/drawn both down toward the rigid base 10 as well as simultaneously forward and away from the vertical or approximately vertical dual stanchions 14a and 14b to assist in delivering a package(s)/item(s) 6 into the vehicle's trunk. Separate and apart from powering the movement of the movable upper platform 5, because of the inherency in the design of the "geared down"/reduced output speed motor 16, the reduced output speed motor 16 holds its rotational position with the "geared down"/reduced output speed motor 16 in the shutdown/powered off mode, whether or not the "geared down"/reduced output speed 16 is under load, the position of the movable upper platform 5 is also held in place.

Figure 6:
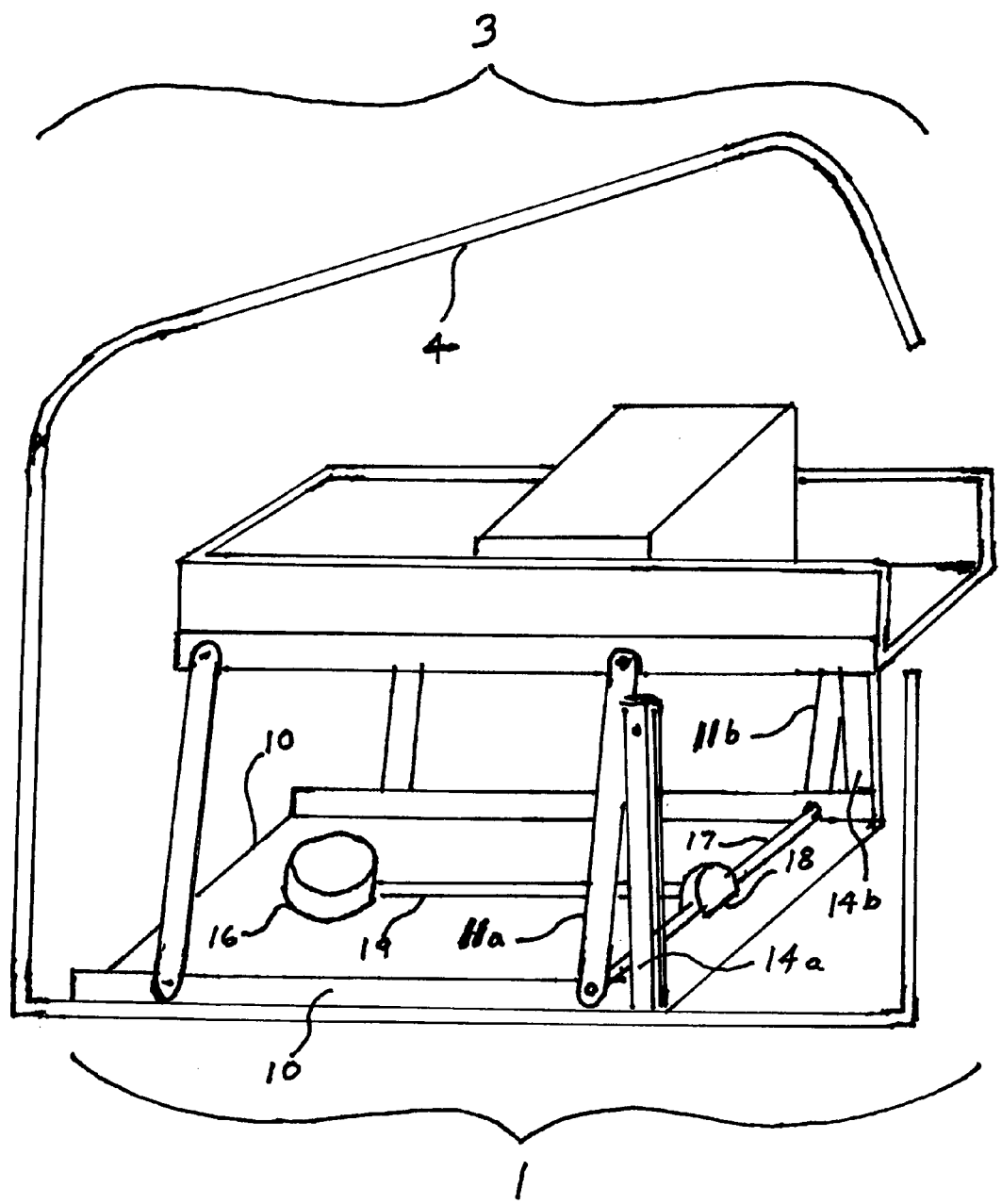
FIG. 6 shows a second embodiment of the system for moving the platform including a gearing connected to the motor to pivotally rotate the lift struts.

FIG. 6 shows apparatus 1 in the fully raised upward and rearward position supporting a package(s)/item(s) 6 with the vehicle's trunk lid 4 of the vehicle's trunk 3 fully open such that the apparatus 1 is employing a fully geared system whereby the rotatable pivot lift support struts 11a and 11b are located directly across from each other on either side of apparatus 1 and are attached directly to a cross shaft 17 which is rotated via a right or other angled gear box 18 which is in turn driven by a direct drive shaft 19 which is in turn driven by a "geared down"/speed reduced motor 16 mounted on the base 10 such that when the "geared down"/reduced output speed motor 16 rotates in one direction, it causes the rotation of the rotatable pivot lift support struts 11a and 11b, at the location where the pivot lift support struts are connected to the movable upper platform 5, to move simultaneously both rearward towards the vertical or approximately vertical dual stanchions 14a and 14b and upward from the base 10 thus in turn causing the movable upper platform 5 to also move simultaneously rearward towards the vertical or approximately vertical dual stanchions 14a and 14b as well as upward to assist in removing a package(s)/item(s) 6 from the vehicle trunk 3. Conversely, as the "geared down"/reduced output speed motor 16 rotates in the opposite direction, it causes the rotatable pivot lift support struts 11a and 11b, at the location where the pivot lift support struts 11a and 11b are connected to the movable upper platform 5 to both move both simultaneously forward and away from the vertical or approximately vertical dual stanchions 14a and 14b as well as downward toward the base 10 thus in turn causing the movable upper platform 5 to also move simultaneously both forward and away from the vertical or almost vertical dual stanchions 14a and 14b as well as downward toward the base 10 to assist in delivering a package(s)/item(s) 6 into the vehicle trunk 3. Again, separate and apart from powering the movement of the movable upper platform 5 because of the inherency in the design of the "geared down"/reduced output speed motor 16 the "geared down"/reduced output speed motor 16 holds its rotational position when the "geared down"/reduced output speed motor 16 is shut down/powered off, whether or not the "geared down"/reduced output speed motor 16 is under load, the position of the pivot lift support struts 11a and 11b, as well as the movable upper platform 5 are held in place.

Figure 7:
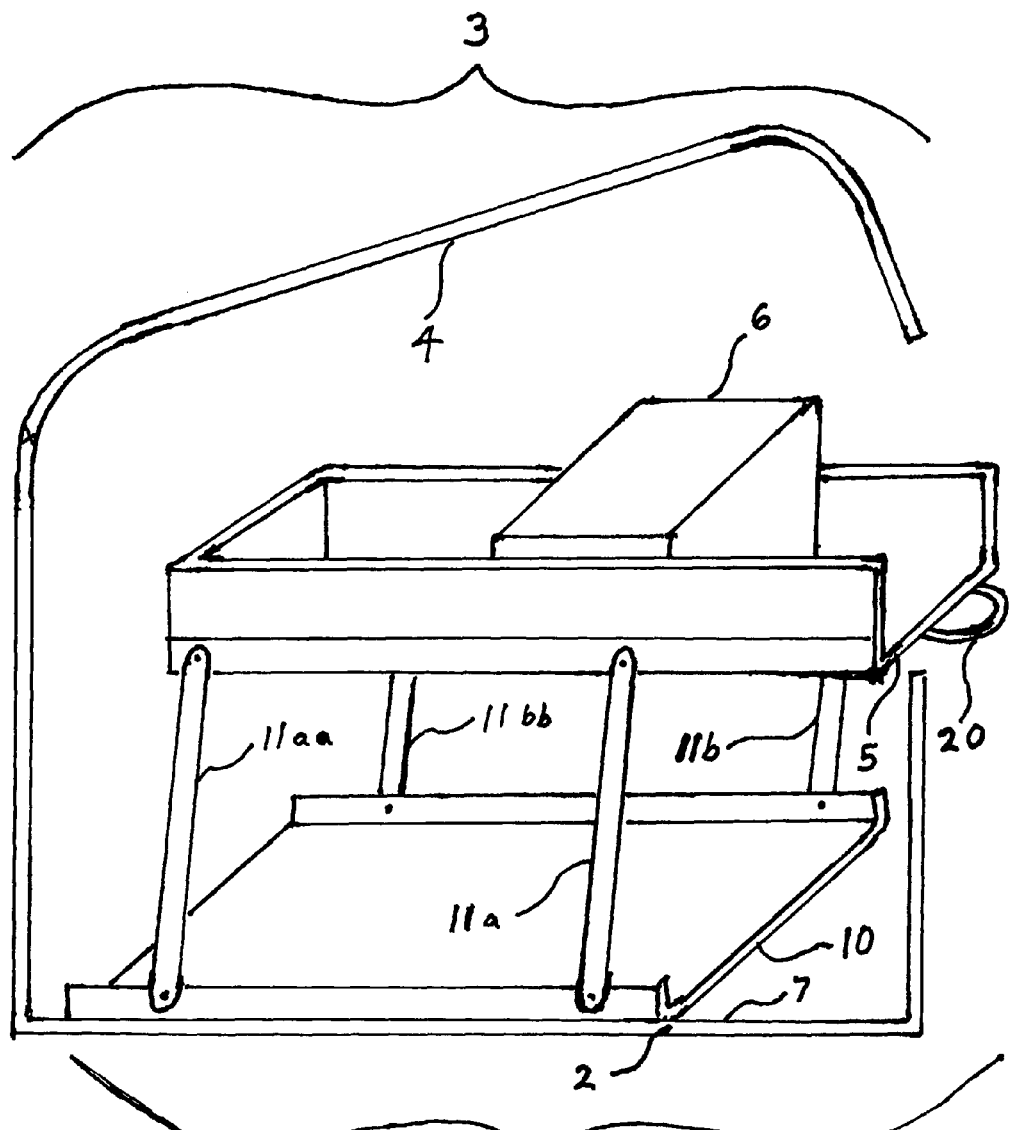
FIG. 7 is similar to FIG. 2 and shown a handle connected to movable upper platform.

FIG. 7 shows the apparatus 1 in the fully raised upward and rearward position supporting a package(s)/item(s) 6 having reached the fully raised upward position via a hand operated handle 20 to rotate up the apparatus's pivot lift support struts 11a and 11b along with along with lift support struts 11aa and 11bb in turn moving the apparatus's movable upper platform 5 to the fully raised upward as well as the fully extended rearward position relative to the front of the vehicle with the vehicle's trunk lid 4 in the full open position. No cable system nor gears are required, just a person's strength to move the movable upper platform 5 to the desired lockable position for removing a package(s)/item(s) 6 from the vehicle's trunk 3 or to load a package(s)/item(s) 6 in the vehicle's trunk 3 as the movable upper platform 5 is released from its lockable position and gravity pulls the movable upper platform 5 back down to the base 10 which was positioned on the upper surface 7 of the floor portion 2 of the vehicle's trunk 3.

What we claim our invention is:

1. A device for more conveniently removing packages/items from a vehicle trunk as well as more conveniently loading packages/items into a vehicle trunk comprising:

(a) a base supporting a plurality of dual stanchions, wherein the stanchions are positioned approximately vertically and at each respective side of said base, and wherein a respective pulley is supported on an upper end of each said stanchion;

(b) a movable upper platform for supporting packages or items in a vehicle trunk;

(c) a plurality of pivot lift support struts positioned on respective sides of the apparatus, wherein the support struts pivotally connect the base to the upper platform such that a 4-bar type movement of the support struts relative to the moveable upper platform and the base causes the moveable upper platform to move vertically in an raising or lowering direction relative to the base while remaining parallel with the base, and wherein during raising and lowering the platform moves forward or backward relative to the base;

(d) a drive motor mounted on the base for driving the upper platform between raised and lowered positions, the motor including a spindle, and wherein the motor is a "geared down"/reduced output type motor which operatively holds the position of the upper platform in place in the event power is shut down or turned off, regardless of whether the upper platform is loaded;

(e) a cable system having a "Y" configuration comprising a plurality of portions, wherein the "Y" configuration cable system includes,
   a. a lower portion attached to the spindle for winding and unwinding thereon,
   b. an upper portion attached at one end to the lower portion, wherein a second end travels over one of the pulleys mounted on one of the vertical stanchions,
   c. while another upper portion attached to the lower portion at a position proximate of the upper portion connection, wherein a second end and travels over another of the pulleys mounted on the other dual vertical stanchion on the other side of the apparatus;
   d. wherein both of the upper portions travel over one of the respective pulleys and are attached to a respective side of the moveable upper platform,
   e. wherein operation of the drive motor winds or unwinds the lower portion on the spindle thereby drawing the moveable upper platform toward the vertical stanchions, wherein by virtue of the 4-bar action of the pivot lift support struts the moveable upper platform simultaneously rises upward and rearward relative to the front of the vehicle, and as the spindle is rotated in the opposite direction the tension in the cable system is reduced thus allowing the moveable upper platform, under the force of gravity, to simultaneously move downward toward the base and forward towards the front of the vehicle;
   f. the cable system is selected from a group comprising cable, rope, plastics, or other types of material; and (f) an optional handle attached to the moveable upper platform proximate a side accessible to the user such that the user can pull by the hand the moveable upper platform upward to a lockable position where the force of gravity will not cause the moveable upper platform to fall back to the base until the person unlocks the moveable upper platform which allows the force of gravity to pull the moveable upper platform back to the base.

2. A device for more conveniently removing packages/items from a vehicle trunk as well as more conveniently loading packages/items into a vehicle trunk comprising:
   (a) a base supporting a plurality of dual stanchions, wherein the stanchions are positioned approximately vertically and at each respective side of said base;
   (b) a movable upper platform for supporting packages or items in a vehicle trunk;
   (c) a plurality of pivot lift support struts positioned on respective sides of the apparatus, wherein the support struts pivotally connect the base to the upper platform such that a 4-bar type movement of the support struts relative to the moveable upper platform and the base causes the moveable upper platform to move vertically in an raising or lowering direction relative to the base while remaining parallel with the base, and wherein during raising and lowering the platform moves forward or backward relative to the base;
   (d) a drive motor mounted on the base for driving the upper platform between raised and lowered positions, the motor including an output drive shaft, and wherein the motor is a "geared down"/reduced output type motor which operatively holds the position of the upper platform in place in the event power is shut down or turned off, regardless of whether the upper platform is loaded;
   (e) a geared system drivingly connected to the motor and which is mounted on the base such that the output shaft drives a right or other angled gearbox which in turn drives another shaft which in turn is connected on both ends to one of the pivot lift support struts directly across on a respective side of the apparatus;
   (f) wherein operation of the motor pivots in either a clockwise or counterclockwise direction pivotally moves the pivots struts upward or downward thereby raising or lowering the upper platform relative to the base while simultaneously moving the upper platform forward or rearward to thus assist in removing packages/items from the vehicle trunk; and
   (g) an optional handle attached to the moveable upper platform proximate a side accessible to the user such that the user can pull by the handle the moveable upper platform up to a lockable position where the force of gravity will not cause the moveable upper platform to fall back to the base until the person unlocks the moveable upper platform which allows the force of gravity to pull the moveable upper platform back to the base.

3. A method for moving for more conveniently removing packages/items from a vehicle trunk as well as more conveniently loading packages/items into a vehicle trunk, the steps comprising:
   (a) providing a device according to claim 1 and placing the device on the floor of the trunk compartment of the vehicle;
   (b) operating the drive motor to drivingly pivot the struts in a clockwise direction while simultaneously raising the upper platform from a lowered position to a raised position to a level where objects can be inserted into the trunk or removed from the trunk without the need to lift any of the objects above any structure of the vehicle, wherein the raised position is both above the location where the lowest portion of the vehicle's trunk lid is when the vehicle's trunk lid is closed and also rearward of the location where the lowest portion of the vehicle's trunk lid is when the trunk lid is closed such that the packages/items are in a much easier and convenient location to be removed from the vehicle's trunk;
   (c) placing the package/object or the packages/objects into the trunk compartment of the vehicle or removing the package/object or the packages/objects from the trunk compartment of the vehicle by placing or removing the package/object or the packages/objects on the upper platform;
   (d) reversibly driving the drive motor to reversibly pivot the struts in a couterclockwise direction while simultaneously lowering the upper platform from a raised position to a lower position, wherein the lowered position is forward of the location where the lowest portion of the vehicle's trunk lid is when the vehicle's trunk lid is closed such that packages/items are positioned into the depth of the vehicle's trunk; and
   (e) closing the lid of the vehicle trunk.

4. A method for moving for more conveniently removing packages/items from a vehicle trunk as well as more conveniently loading packages/items into a vehicle trunk, the steps comprising:
   (a) providing a device according to claim 2 and placing the device on the floor of the trunk compartment of the vehicle;
   (b) operating the drive motor to drivingly pivot the struts in a clockwise direction while simultaneously raising the upper platform from a lowered position to a raised position to a level where objects can be inserted into the trunk or removed from the trunk without the need to lift any of the objects above any structure of the vehicle, wherein the raised position is both above the location where the lowest portion of the vehicle's trunk lid is when the vehicle's trunk lid is closed and also rearward of the location where the lowest portion of the vehicle's trunk lid is when the trunk lid is closed such that the packages/items are in a much easier and convenient location to be removed from the vehicle's trunk;
   (c) placing the package/object or the packages/objects into the trunk compartment of the vehicle or removing the package/object or the packages/objects from the trunk compartment of the vehicle by placing or removing the package/object or the packages/objects on the upper platform;
   (d) reversibly driving the drive motor to reversibly pivot the struts in a couterclockwise direction while simultaneously lowering the upper platform from a raised position to a lower position, wherein the lowered position is forward of the location where the lowest portion of the vehicle's trunk lid is when the vehicle's trunk lid is closed such that packages/items are positioned into the depth of the vehicle's trunk; and
   (e) closing the lid of the vehicle trunk.

\* \* \* \* \*